United States Patent
Yamauchi et al.

(10) Patent No.: US 7,813,232 B2
(45) Date of Patent: Oct. 12, 2010

(54) DISC DRIVE

(75) Inventors: Yoshiaki Yamauchi, Omitama (JP); Ikuo Nishida, Ebina (JP); Hisahiro Miki, Chigasaki (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 741 days.

(21) Appl. No.: 11/698,098

(22) Filed: Jan. 26, 2007

(65) Prior Publication Data
US 2008/0062828 A1 Mar. 13, 2008

(30) Foreign Application Priority Data
Sep. 11, 2006 (JP) ............... 2006-244973

(51) Int. Cl.
*G11B 7/00* (2006.01)
(52) U.S. Cl. .................. 369/44.32
(58) Field of Classification Search ........ 369/44.32
See application file for complete search history.

(56) References Cited

U.S. PATENT DOCUMENTS 5,748,587 A * 5/1998 Sim .................. 369/47.45
5,970,035 A * 10/1999 Ohmori et al. ............ 369/53.2
2004/0076091 A1* 4/2004 Yonezawa ............... 369/44.29
2004/0085868 A1* 5/2004 Ohno et al. ............. 369/44.32
2006/0072413 A1* 4/2006 Raaymakers ............ 369/53.18

FOREIGN PATENT DOCUMENTS

JP 2003-217153 7/2003

* cited by examiner

*Primary Examiner*—Daniell L Negrón
*Assistant Examiner*—Nicholas Lee
(74) *Attorney, Agent, or Firm*—Antonelli, Terry, Stout & Kraus, LLP.

(57) ABSTRACT

Since a disc vibrates in a natural mode at a predetermined rotation speed, a variation in a tilt of the disc relative to an optical head is caused. As a result, the read/write performance of a disc drive is deteriorated. The disc drive has a disc tilt database for recording a relative tilt angle of the disc in a tangential direction thereof associated with the disc natural mode and the disc rotation speed at which such tilt occurs, a circuit for detecting a disc rotation speed, and a tilt drive circuit. An objective lens is tilted so that the relative tilt angle is corrected, and thus, stable read/write performance of the disc drive is achieved.

9 Claims, 11 Drawing Sheets (0, 2) MODE (0, 3) MODE (0, 4) MODE

DISC DRIVE

FIELD OF THE INVENTION

The present invention relates to a disc drive having a function of correcting tilt characteristics of a disc caused during high-speed rotation of the disc, such characteristics being a cause of deterioration in read/write performance.

BACKGROUND ART

A conventional technology discloses a method for reducing a tilt of the reading/writing surface of a disc relative to the optical axis of a beam. In the method, information concerning the tilt of the reading/writing surface of the disc opposite to an objective lens is detected, and based on the information, the objective lens is tilted.

Patent Document 1 discloses a tilt control method. According to the method, when making various types of adjustments, such as an adjustment of a laser power with respect to the disc mounted in a disc drive, a laser beam is emitted by shifting an objective lens by a predetermined amount with the optical head at a position to be adjusted and at a disc rotation speed to be adjusted, and the relationship between a shift amount of the objective lens and an offset of a push-pull tracking error signal is learned, so that the learned relationship is maintained during reading/writing.

[Patent Document 1] JP Patent Publication (Kokai) No. 2003-217153 A

SUMMARY OF THE INVENTION

Problems to be Solved by the Invention

In Patent Document 1, since the push-pull tracking error signal is used, it is possible to detect information concerning a tilt of the disc in a radial direction thereof, such as a warp in the direction of an inner or outer circumference of the disc. However, it is difficult to detect information concerning a tilt in a tangential direction of the disc. Further, since the relationship between the shift amount of the objective lens and the offset of the push-pull tracking error signal is learned for every single disc to be mounted in the disc drive, results of such learning cannot be commonly used for discs in general.

A standardized CD or DVD disc has a diameter of 120 mm and a thickness of 1.2 mm, and it is made of polycarbonate. Such disc has a natural disc vibration mode, and particularly, a disc vibration mode involving disc diameter nodes is excited at a predetermined disc rotation speed. In the CLV (Constant Linear Velocity) system, since the disc is rotated at such a predetermined disc rotation speed, the disc is vibrated, and therefore deformation associated with a vibration mode is caused. Thus, a relative variation in the angle between the optical axis of the laser beam from the optical head and the reading/writing surface of the disc is caused. This angular variation is due to a diameter node mode of the disc, and it results in a tilt in a direction perpendicular to a radial direction of the disk within the plane of the disc (to be hereafter referred to as a "tangential direction of the disc), the tilt involving a line in a radial direction as a rotation axis. An object to be achieved by the present invention is to stabilize read/write performance in view of such tilt of the disc associated with the above disc vibration.

Means of Solving the Problems

In order to achieve the above object, the disc drive of the present invention includes a means of detecting the rotation speed of a disc, a means of tilting an objective lens in a tangential direction of the disc, and a tilt drive circuit for tilting the objective lens in a tangential direction of the disc at an angle corresponding to a predetermined rotation speed of the disc.

EFFECTS OF THE INVENTION

The present invention prevents deterioration in read/write performance associated with disc vibration caused during high-speed disc rotation, and thus it can provide a highly reliable disc drive.

DESCRIPTION OF PREFERRED EMBODIMENTS OF THE INVENTION

Figure 1:
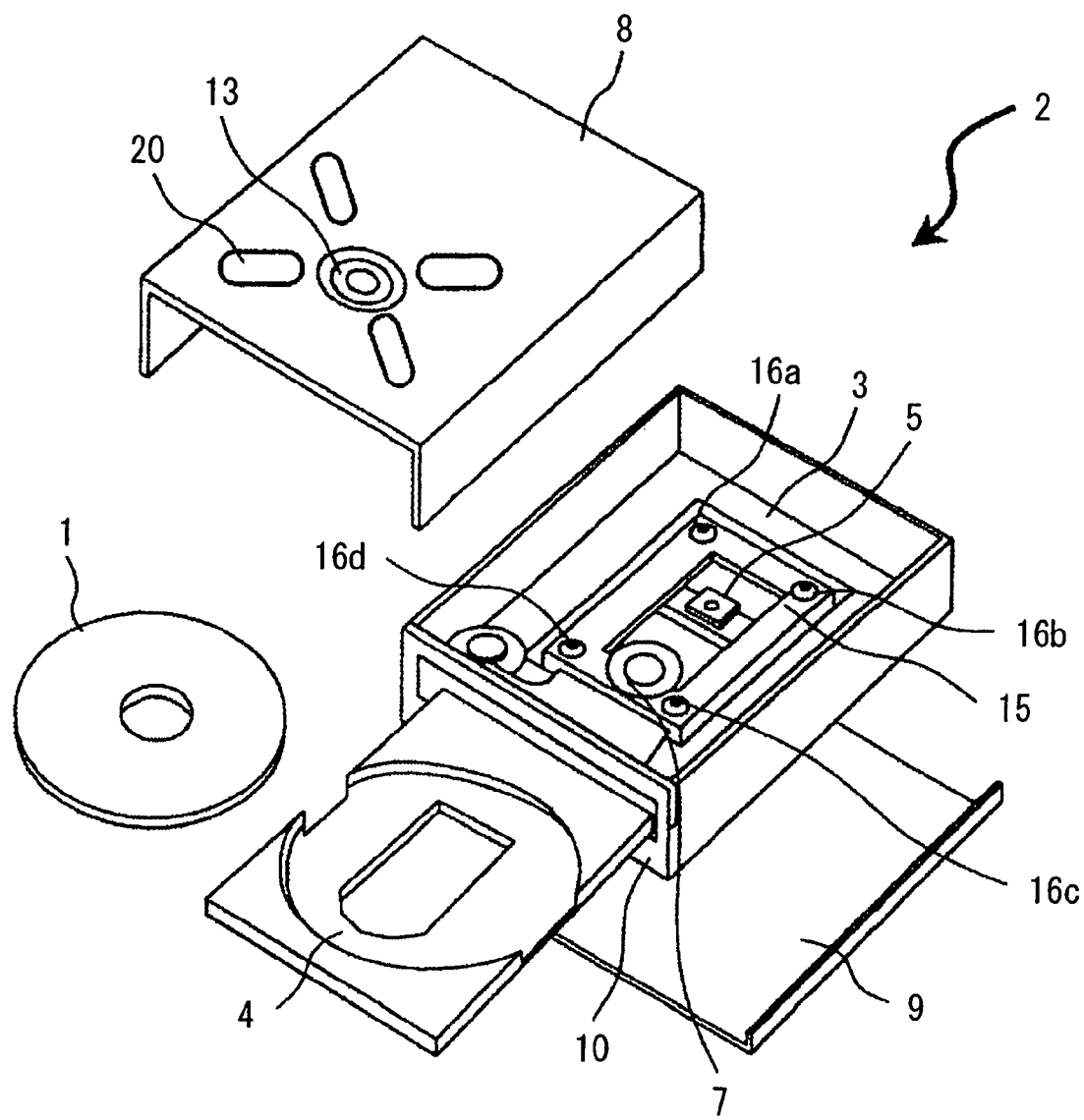
FIG. 1 shows a structure of a disc drive.

Embodiments of the present invention will be hereafter described.

Embodiment 1

While an embodiment of a disc drive 2 of the present invention will be hereafter described using an example of the disc drive 2, such as a CD drive or a DVD drive, the present invention can be applied to other disc drives.

The disc drive 2 for CDs, DVDs, or the like, incorporated in a personal computer or the like is a device for writing or reading information on a disc-shaped medium (to be hereafter referred to as "disc 1") having a diameter of 120 mm and a thickness of 1.2 mm. The drive has a shape of a box with a width of about 150 mm, a depth of 195 mm, and a thickness of 40 mm.

The drive casing is composed of a mechanical base 3 consisting of a resin molded article, a bottom cover 9, and a top cover 8, both of which are formed by pressing a metal plate such as rolled steel. In the drive, a disc tray 4 for inserting or ejecting the disc 1 is supported by a guide mechanism with which the mechanical base 3 is provided. The disc tray 4 is provided with a circular depression slightly larger than the external diameter of the disc 1 for positioning when the disc 1 is mounted. A unit mechanism including a spindle motor 7 for rotating the disc 1 and an optical head 5 for reading information or writing new information on the disc 1 in the lower part of the disc tray 4 is elastically supported by the mechanical base 3 via a plurality of insulators 16.

Regarding the operation of reading/writing, the disc 1 inserted in the drive is mounted on a turn table portion of the spindle motor 7 with a disc clamper 13 with which the top cover 8 portion is provided, and the disc 1 is then rotated by the spindle motor 7 at a predetermined rotation speed, whereby information on the disc 1 is read or new information is written with the optical head 5. Since the disc 1 vibrates at such a predetermined rotation speed when rotated in the drive, based on the disc drive 2 of the present invention, by providing the top cover 8 with a protruding restriction structure 20 on the surface opposite to the disc 1, deformation modes associated with vibration of the disc above the optical head 5 are suppressed, and a tilt of the optical head 5 or a tilt of an objective lens 11 portion of the optical head 5 is corrected in accordance with a tilt associated with such disc deformation caused when exceeding or falling below the predetermined rotation speed. In this way, the read/write performance of the disc drive 2 is improved. The present invention will be hereafter described in detail with reference to FIG. 2 and the subsequent drawings.

Figure 2:
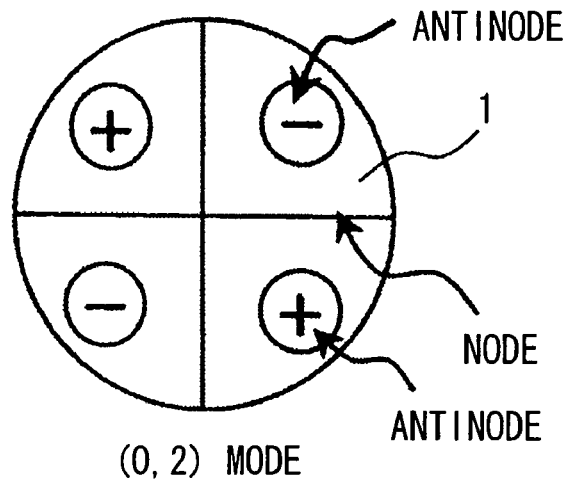
FIG. 2 shows diameter-node vibration modes of a disc.
Figure 2:
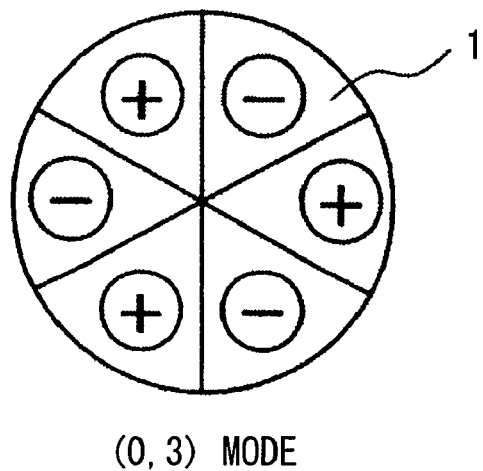
Figure 2:
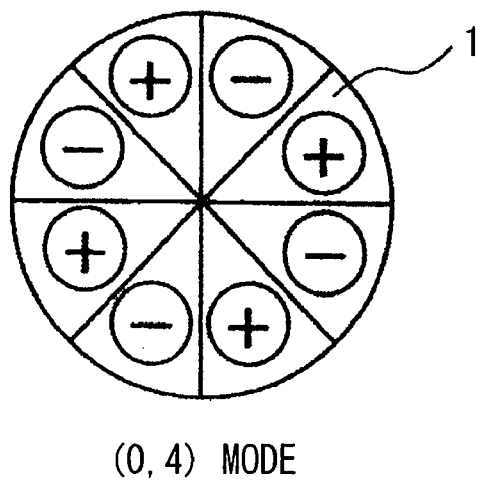

FIG. 2 schematically shows diameter-node secondary, tertiary, and biquadratic vibration modes of the disc 1 that is a conventional disc used in the disc drive 2, and in the figure, symbols (+) and (−) on the disc are used to represent modes of deformation or displacement in radially outward directions of the disc. Portions designated by the symbols (+) and (−) represent antinodes in each of the modes, and the straight lines passing through the center of the disc 1 represent nodes in each of the modes. These modes will be hereafter referred to as (0, 2) mode, (0, 3) mode, and (0, 4) mode of the disc 1. When the disc 1 is rotated and the rotation thereof is observed based on a static system, such phenomenon in which the disc 1 seems stationary in one of the deformation modes at a predetermined rotation speed is seen. Such rotation speed is referred to as a "critical rotation speed," where the disc 1 is caused to be in an unstable state with respect to disturbance. Particularly, deformation or vibration of the disc 1 is caused due to uneven pressure, such as air turbulence attributable to the peripheral constitution of the disc 1. As for the disc drive 2, the read/write performance is deteriorated, and thus errors are caused, whereby a serious negative impact is caused.

Figure 3:
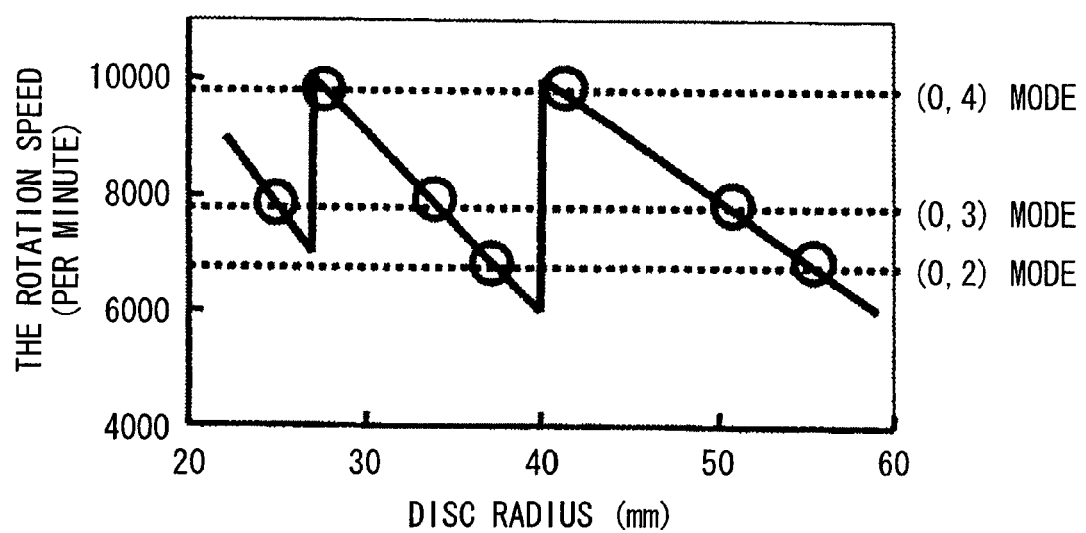
FIG. 3 shows a rotation specification of the disc.

FIG. 3 shows an example of a disc rotation specification of a DVD having 12× write speed. This rotation specification is referred to as the "ZCLV (Zone Constant Linear Velocity) system. The rotation speed of the disc 1 is varied depending on the read/write position in a radial direction of the disc 1. In this case, the disc 1, which is a general CD or DVD, has a diameter of 120 mm and a thickness of 1.2 mm, and it is made of polycarbonate resin. The critical rotation speed corresponding to the vibration specific to the above (0, 2) mode is about 6900 revolutions per minute, about 7800 revolutions per minute in the (0, 3) mode, and about 9900 revolutions per minute in the (0, 4) mode.

Thus, based on the above disc rotation specification, the rotation speed of the disc 1 exceeds or falls below (indicated by ○ in the figure) the critical rotation speeds as shown in the figure in each of the modes (0, 2), (0, 3), and (0, 4) during reading/writing. Namely, the above-mentioned problems are caused, since large vibration is instantaneously caused to the disc 1 when the disc rotation speed exceeds or falls below each critical rotation speed. While a DVD having 12× speed is used as an example in the present explanation, it is needless to say that a (0, 5) mode of the disc needs to be considered when a disc having a greater speed is used.

Figure 4:
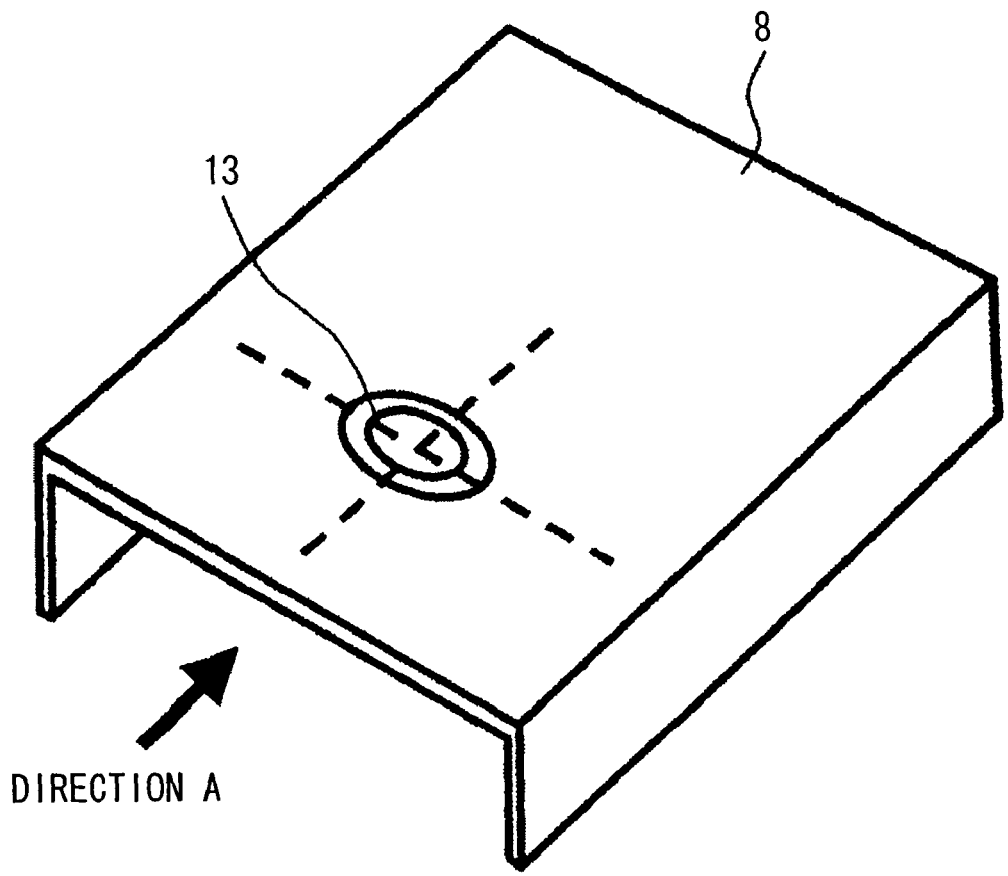
FIG. 4 shows a structure of a general top cover.
Figure 4:
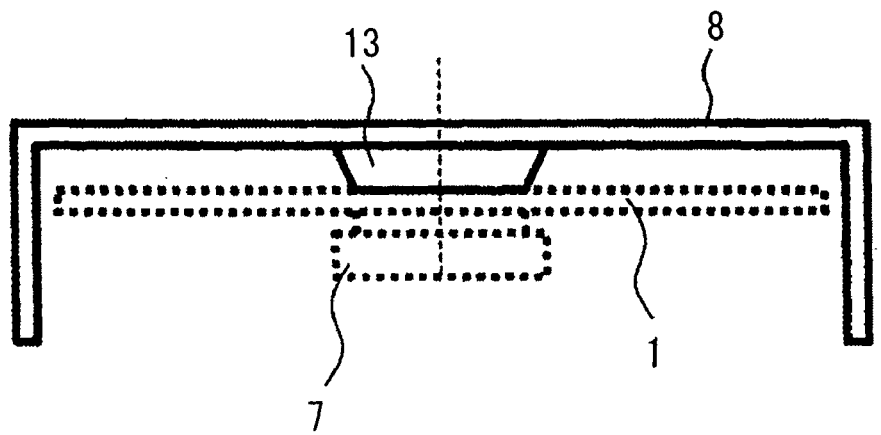

FIG. 4 shows the top cover 8, which is a conventional top cover, used for the disc drive 2. FIG. 4(*a*) shows a perspective view of the top cover 8. When the disc 1 inserted into the disc drive 2 is mounted, the disc 1 is fixed by being sandwiched between the disc clamper 13 installed on the backside of the top cover 8 (the under side) and the turn table portion of the spindle motor 7, utilizing magnetic attraction force. FIG. 4(*b*) is a cross-sectional view of the top cover 8, showing the center of the disc clamper 13 portion in a direction A. Note that, in the figure, the disc 1 that has been mounted and the spindle motor 7 are illustrated by broken lines. Disc vibration caused when the rotation speed exceeds or falls below any of the critical rotation speeds in cases in which the gap between the disc 1 and the top cover 8 is approximately even will be described with reference to FIGS. 5 to 7.

Figure 5:
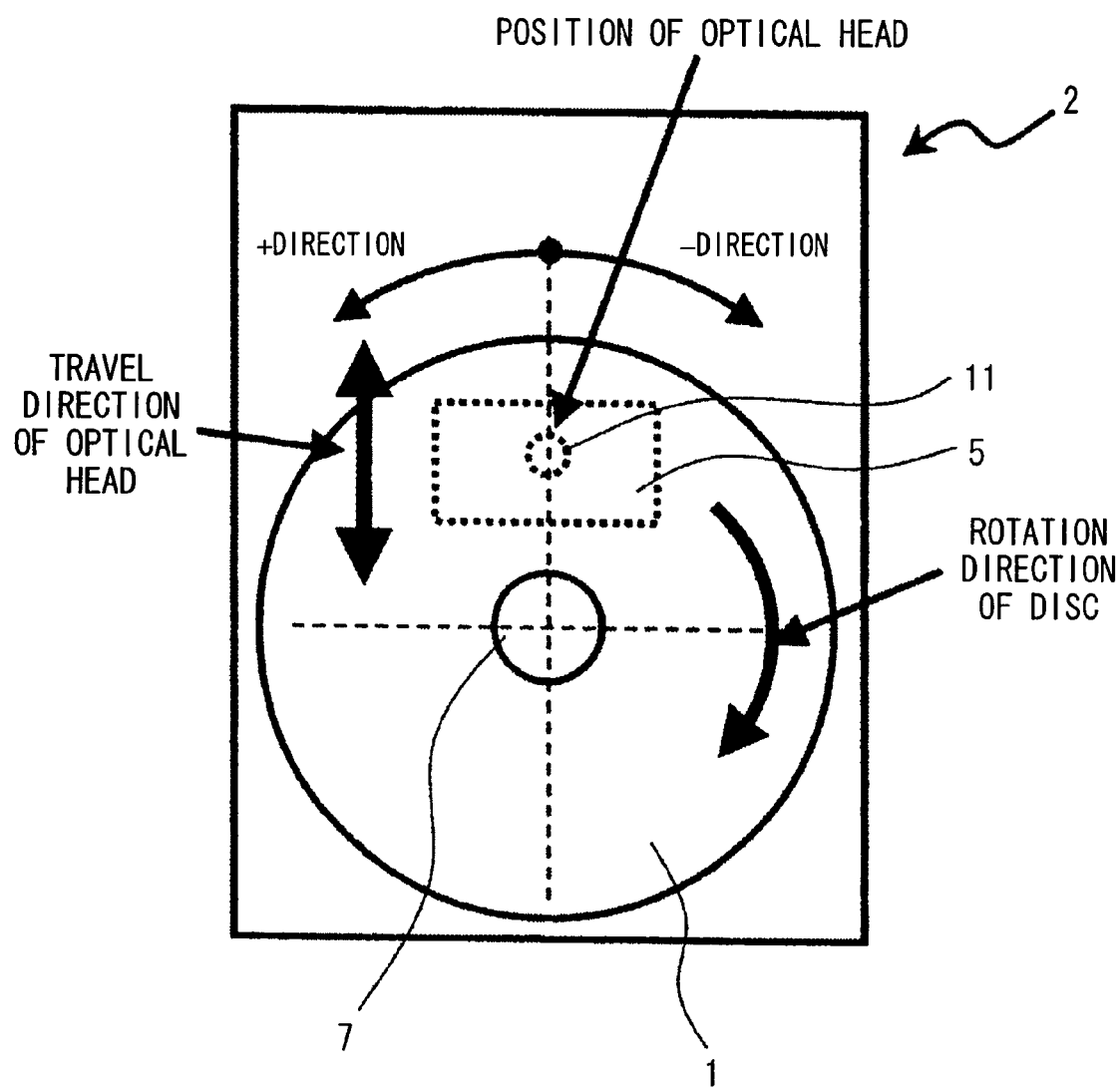
FIG. 5 shows the relationship between deformation of the disc and a position of an optical head in the disc drive.

FIG. 5 is a top view of the disc drive 2, showing a positional relationship between the disc 1 and the optical head 5 in the disc drive 2, and, in the figure, the disc 1 is mounted while the top cover 8 is removed. The optical head 5 travels in a radial direction of the disc 1 between the inner circumference and the outer circumference of the disc 1, as indicated by an arrow in the figure. In order to show vibration or displacement modes in the radially outward directions of the disc near the position of the optical head 5 shown in FIG. 6, the left side of FIG. 5 in the disc circumferential direction is determined to be a + direction and the right side thereof is determined to be a − direction, with reference to the traveling position of the optical head 5.

Figure 6:
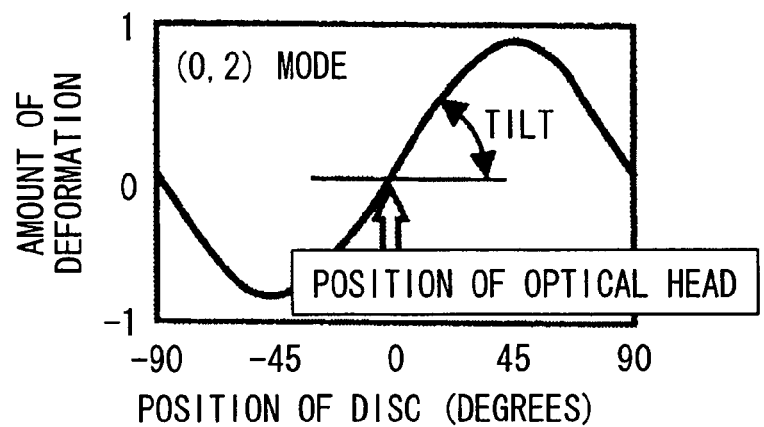
FIG. 6 shows tilt characteristics of the disc near the optical head due to disc vibration.
Figure 6:
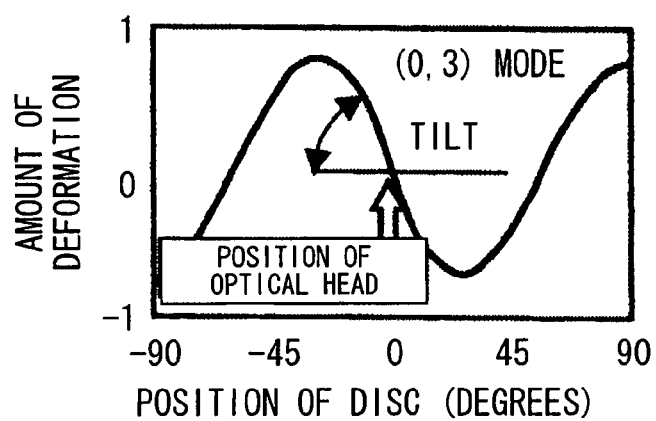
Figure 6:
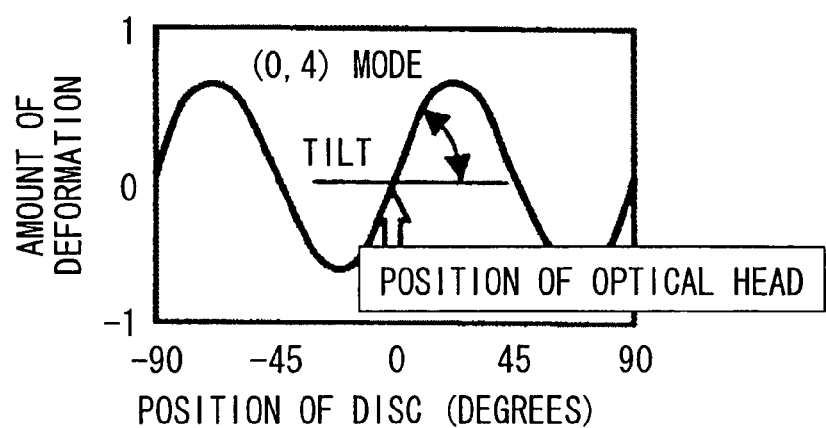

FIG. 6 shows deformation modes of the outer circumferential portion of the disc near the optical head 5 with respect to the position of the optical head 5. FIG. 6(*a*) shows a deformation mode of the (0, 2) mode of the disc 1. FIG. 6(*b*) and FIG. 6(*c*) show the (0, 3) mode and the (0, 4) mode of the disc 1, respectively. In cases in which the surface opposing the disc 1 is the even top cover 8 shown in FIG. 4, with regard to the deformation mode of such disc vibration mode when exceeding or falling below any of the critical rotation speeds, the position of a mode node corresponds to the position of the optical head 5 in each of the (0, 2), (0, 3), and (0, 4) modes of the disc 1; that is, the tilt of the disc 1 relative to the optical head 5 becomes maximum. The actual tilt in the tangential direction of the disc 1, such as a standardized polycarbonate resin CD or DVD having a diameter of 120 mm and a thickness of 1.2 mm, is about 0.3 degrees, about 0.2 degrees, and about 0.2 degrees, in the (0, 2) mode, (0, 3) mode, and (0, 4) mode, respectively, near the outer circumference portion of the disc. Thus, it is only necessary to tilt the objective lens 11 by about 0.3 degrees, about 0.2 degrees, or about 0.2 degrees in the tangential direction of the disc only when the disc is in such mode.

Figure 7:
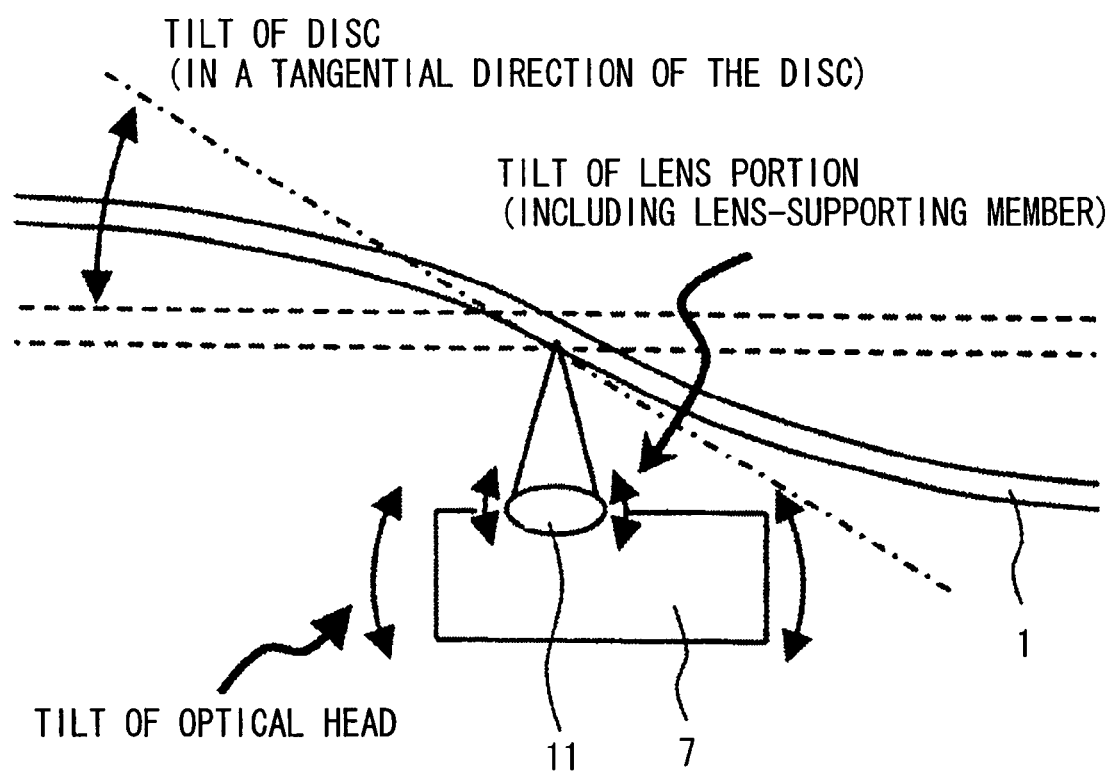
FIG. 7 shows the relationship between a tilt of the disc and the optical head.

FIG. 7 shows a method for correcting the tilt of the disc 1 relative to the optical head 5 when the rotation speed of the disc 1 exceeds or falls below one of the critical rotation speeds. When exceeding or falling below any of the critical rotation speeds, a vibration mode involving disc diameter nodes is caused. At this point, the disc 1 is caused to be deformed in the tangential direction thereof, as shown in the figure. In order to correct a tilt amount of the disc 1 relative to the optical head 5, it is necessary to tilt the objective lens 11 portion incorporated in the optical head 5 in accordance with the tilt amount of the disc 1 or to tilt the optical head 5 itself.

In the present invention, such tilt amount of disc 1 relative to the optical head 5 due to disc vibration is corrected by making a database of deformation states near the optical head 5 due to the individual disc vibration modes as shown in FIG. 6 caused when exceeding or falling below the critical rotation speeds, and by tilting the objective lens 11 portion or the optical head 5 itself, before exceeding or falling below the predetermined rotation speeds, as described above. Since the tilt in each disc vibration mode is known, by storing the tilt corresponding to each disc vibration mode in the database and by tilting the objective lens 11 at a corresponding angle upon occurrence of each disc vibration mode, components for detecting the tilt become unnecessary. Namely, in accordance with the present invention, if the rotation speed of the disc 1 alone can be detected, a sensor for measuring a tilt of the disc 1 or the like does not need to be installed. By correcting the tilt amount of the objective lens 11 portion or the optical head 5 in a predetermined direction when exceeding or falling below any of the predetermined rotation speeds, the tilt of the disc 1 relative to the optical head 5 due to disc vibration can be reduced, whereby read/write performance can be improved.

In the present invention, while the tilt of the disc 1 is corrected at any of the predetermined disc rotation speeds, the operation for correcting the tilt in the tangential direction of the disc is not performed at speeds other than the predetermined rotation speeds.

Figure 8:
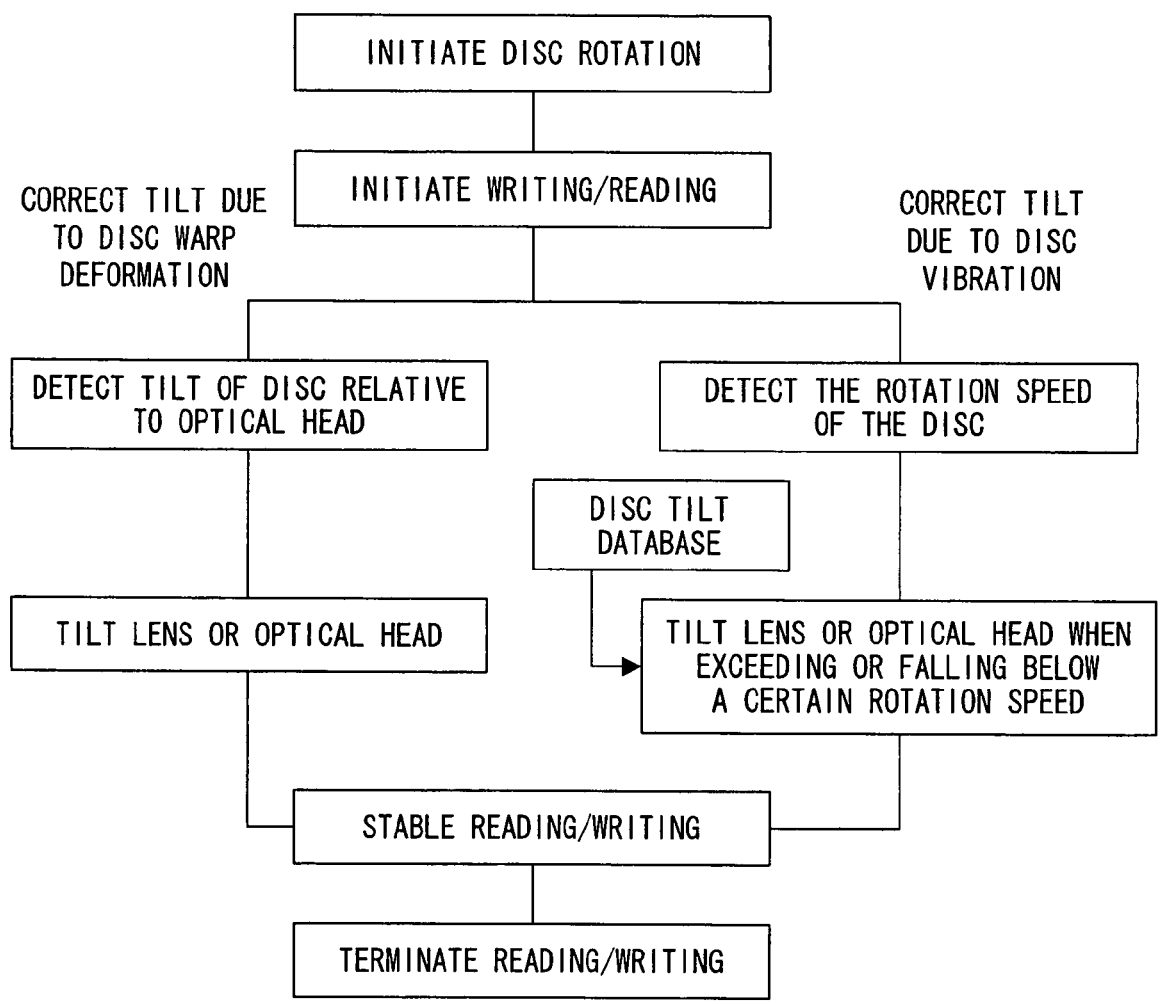
FIG. 8 shows a procedure for correcting the tilt according to the present invention.

FIG. 8 shows a procedure for correcting the tilt of the disc 1 relative to the optical head 5 according to the present invention. When the disc 1 is inserted into the disc drive 2, disc rotation is initiated. After information for determining the type of the disc 1 or the like is obtained, and a preparation for servo system tracking control between the optical head 5 and the disc 1 is completed, a predetermined reading/writing is initiated. The left column in the figure shows a flow of a conventional art for correcting the tilt of the disc 1 relative to the optical head 5, the tilt being associated with deformation such as a warp of the disc 1. Generally, the tilt of the disc 1 relative to the optical head 5 (objective lens 11 in practice) is detected by a detector with which the optical head 5 is additionally provided, and based on the information obtained, a correction is made by tilting the objective lens 11 portion or the optical head 5 itself. In contrast, the right column in the figure shows a tilt correction due to deformation of the disc 1 associated with disc vibration caused when exceeding or falling below any of the critical rotation speeds according to the present invention. The rotation speed at which disc vibration occurs and a deformation mode of the disc caused above the optical head 5 at the rotation speed are determined based on the shape of the disc 1, the natural frequency of the disc due to material (stiffness), or the peripheral constitution of the disc 1. Thus, in order to correct the tilt associated with deformation of the disc 1, a detector or the like for detecting the deformation mode of the disc 1 is not necessary. However, it is important to make a database of disc rotation speeds at which such deformation modes occur and disc deformation modes at the speeds. In the disc drive, a disc rotation speed is detected, and based on the database, the tilt of the objective lens 11 portion or the optical head 5 itself is corrected when exceeding or falling below one of the predetermined rotation speeds. By correcting such tilt of the disc 1 relative to the optical head 5, stable reading/writing can be executed.

Figure 9:
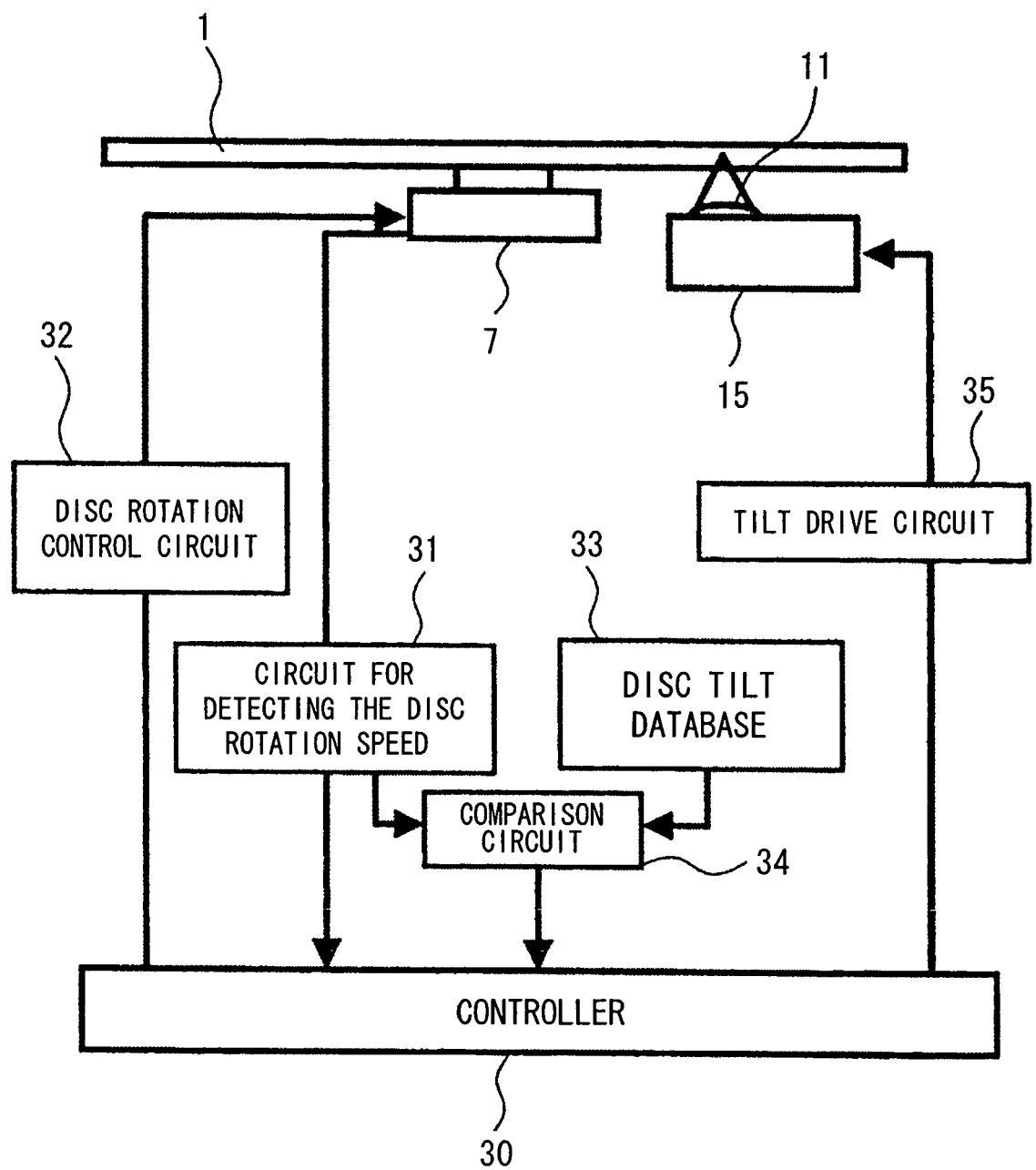
FIG. 9 shows a structure for correcting the tilt according to the present invention.

FIG. 9 shows the above-mentioned structure of the present invention for correcting the tilt of disc 1 relative to the optical head 5. The spindle motor 7 is provided with a disc rotation detector such as a hall element, and, based on a signal from the detector, a circuit 31 for detecting a disc rotation speed sends information concerning the rotation to a disc drive controller 30. The controller 30 drives and controls the spindle motor 7 via a disc rotation control circuit 32, based on such information as the type of the disc 1, the read/write speed, the disc rotation specification based on the speed, and the read/write position of the disc 1 (the position of the optical head 5 in the radial direction of the disc). Meanwhile, regarding the correction according to the present invention of a tilt of disc 1 above the optical head 5 due to the disc vibration mode, the present invention includes a disc tilt database 33 having information concerning the disc rotation speed associated with a mode of the disc drive and the tilt angle with respect to the optical axis above the optical head 5, and a comparison circuit 34 that always monitors the information concerning the disc rotation speed outputted from the circuit 31 for detecting the disc rotation speed. The objective lens 11 with which the optical head 5 is provided is driven by a tilt drive circuit 35 via the controller 30 at a predetermined rotation speed, so as to correct the tilt of the disc 1 relative to the optical head 5.

Figure 10:
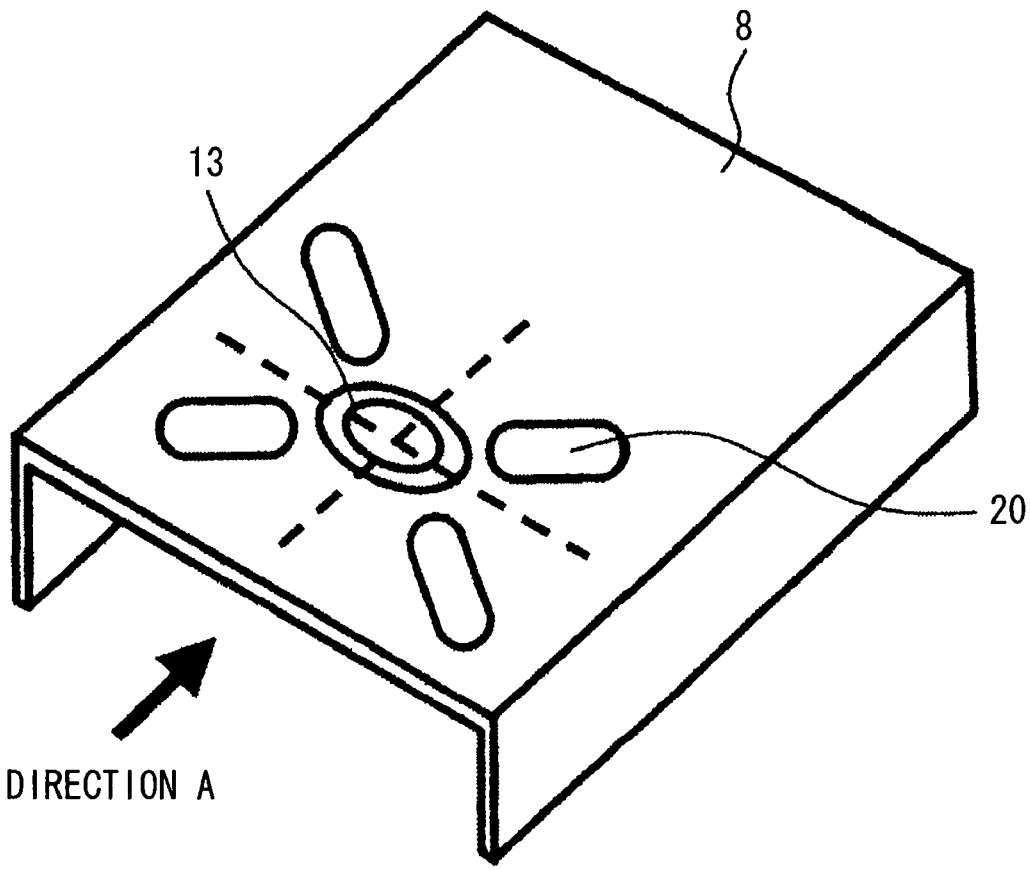
FIG. 10 shows a structure of a top cover according to an embodiment of the present invention.
Figure 10:
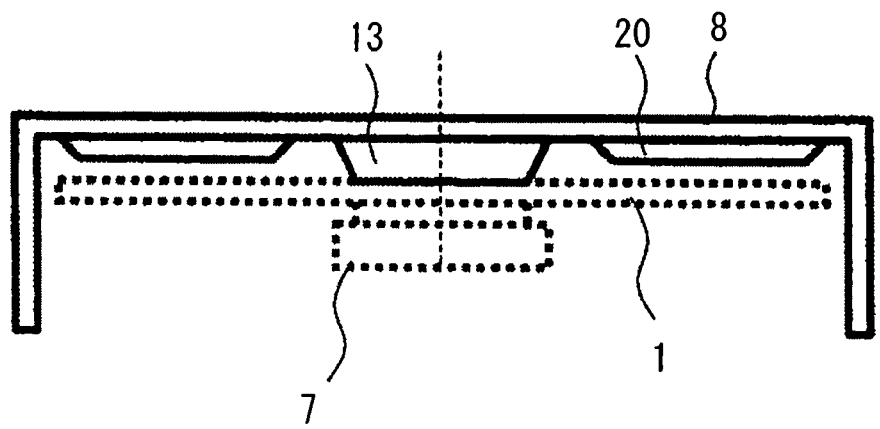

FIG. 10 shows the top cover 8 having the protruding restriction structure 20 on its backside opposite to the disc 1 inserted in the disc drive 2. FIG. 10(a) shows a perspective view of the top cover 8. The disc clamper 13 is mounted on a position corresponding to the center portion of the disc 1. FIG. 10(b) shows a cross-sectional view of the top cover 8 seen in the direction A. In the figure, the disc 1 inserted in the disc drive 2 and the spindle motor 7 are indicated by broken lines. When the disc 1 is rotated at high speed, surface air flow is caused to be turbulent around the upper surface of the disc due to the above restriction structure 20 of the top cover 8, whereby the deformation mode associated with disc vibration caused when exceeding or falling below any of the critical rotation speeds is changed.

Figure 11:
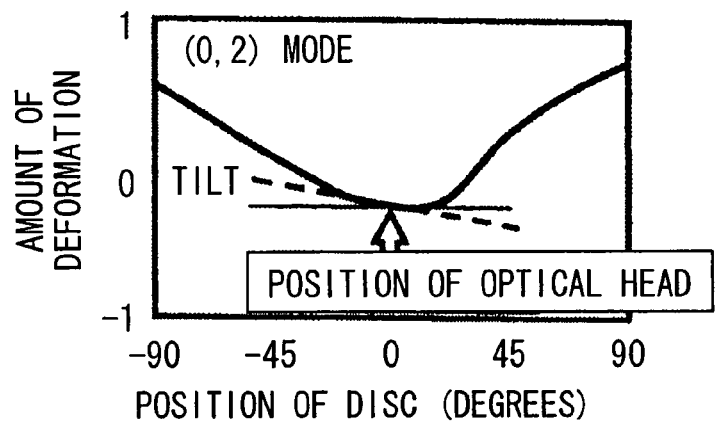
FIG. 11 shows tilt characteristics of the disc near the optical head due to disc vibration when the top cover according to the embodiment of the present invention is used.
Figure 11:
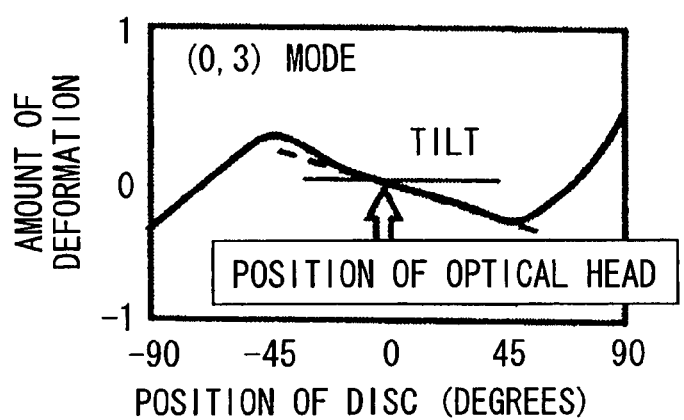
Figure 11:
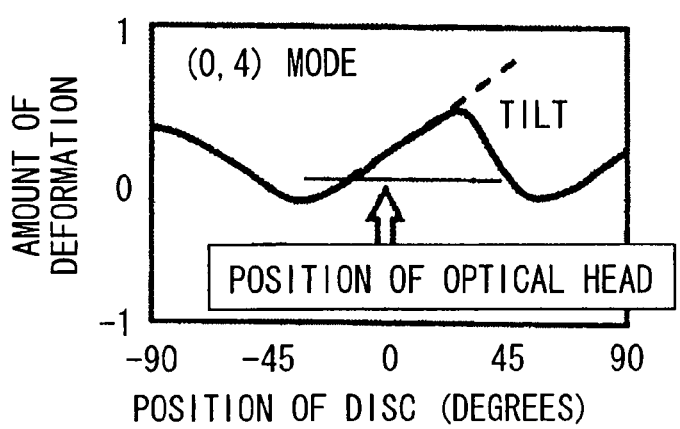

FIG. 11 shows disc deformation states near the optical head with reference to the position of the optical head 5 in the (0, 2) mode, (0, 3) mode, and (0, 4) mode of the disc 1, in cases in which the top cover 8 shown in FIG. 10 having the restriction structure 20 is used. In the case of the top cover 8 of which surface opposite to the disc 1 is even, node positions in the diameter-node vibration modes of the disc 1 above the optical head 5 are moved due to the above turbulent flow. In the (0, 2) mode, such position is now that of an antinode. Further, in each of the (0, 3) mode and the (0, 4) mode, the amplitude of disc vibration is reduced. Namely, by installing the protruding restriction structure 20 on the surface opposite to the disc 1, the deformation mode of the disc above the optical head 5 is changed, and as a result, it becomes possible to reduce the tilt of the disc 1 relative to the optical head 5. While the structure of the top cover 8 is one embodiment of the present invention, it is possible to realize stable reading/writing by making a database of tilt amounts of disc 1 relative to the optical head 5 based on disc vibration behaviors near the position of the optical head 5 associated with the shape of the top cover 8 caused when exceeding or falling below any of the critical rotation speeds and by conducting the correction procedure shown in FIG. 8.

INDUSTRIAL APPLICABILITY

The present invention can be used for an optical disc drive.

The invention claimed is:

1. A disc drive, comprising:
   a detecting unit which detects the rotation speed of a disc; and
   a tilt drive circuit that performs an operation for tilting an objective lens at a predetermined tilt angle in a direction tangential to the disc, when the detected rotation speed of the disc corresponds to a predetermined rotation speed.

2. The disc drive according to claim 1, further comprising a storage medium having a database that stores predetermined tilt angles in a direction tangential to the disc corresponding to when the rotation speed of the disc is substantially 6900 revolutions per minute, substantially 7800 revolutions per minute, substantially 9900 revolutions per minute, and substantially 11700 revolutions per minute.

3. The disc drive according to claim 2, further comprising:
a casing including a top cover and a bottom cover;
an optical head on which the objective lens is mounted;
a driving unit for driving the optical head in a radial direction of the disc;
a spindle motor for rotating the disc;
a disc tray on which the disc is mounted when the disc is inserted or ejected; and
a mechanical base on which the disc tray is installed.

4. The disc drive according to claim 1,
further comprising a storage medium having a database that stores tilt angles in a tangential direction-of-direction tangential to the disc corresponding to a (0, 2) vibration mode, a (0, 3) vibration mode, a (0, 4) vibration mode, and a (0, 5) vibration mode of the disc during the rotation of the disc.

5. The disc drive according to claim 4, further comprising:
a casing including a top cover and a bottom cover;
an optical head on which the objective lens is mounted;
a driving unit for driving the optical head in a radial direction of the disc;
a spindle motor for rotating the disc;
a disc tray on which the disc is mounted when the disc is inserted or ejected; and
a mechanical base on which the disc tray is installed.

6. The disc drive according to claim 1, wherein the tilt drive circuit does not perform the operation for tilting the objective lens at a predetermined tilt angle in a tangential direction of the disc when the detected rotation speed of the disc does not correspond to the predetermined rotation speed.

7. The disc drive according to claim 6, further comprising:
a casing including a top cover and a bottom cover;
an optical head on which the objective lens is mounted;
a driving unit for driving the optical head in a radial direction of the disc;
a spindle motor for rotating the disc;
a disc tray on which the disc is mounted when the disc is inserted or ejected; and
a mechanical base on which the disc tray is installed.

8. The disc drive according claim 1, further comprising:
a casing including a top cover and a bottom cover;
an optical head on which the objective lens is mounted;
a driving unit for driving the optical head in a radial direction of the disc;
a spindle motor for rotating the disc;
a disc tray on which the disc is mounted when the disc is inserted or ejected; and
a mechanical base on which the disc tray is installed.

9. The disc drive according to claim 1,
wherein the disc is a polycarbonate disc having a diameter that is substantially 120 mm and a thickness that is substantially 1.2 mm.

* * * * *